United States Patent Office 3,564,862
Patented Feb. 23, 1971

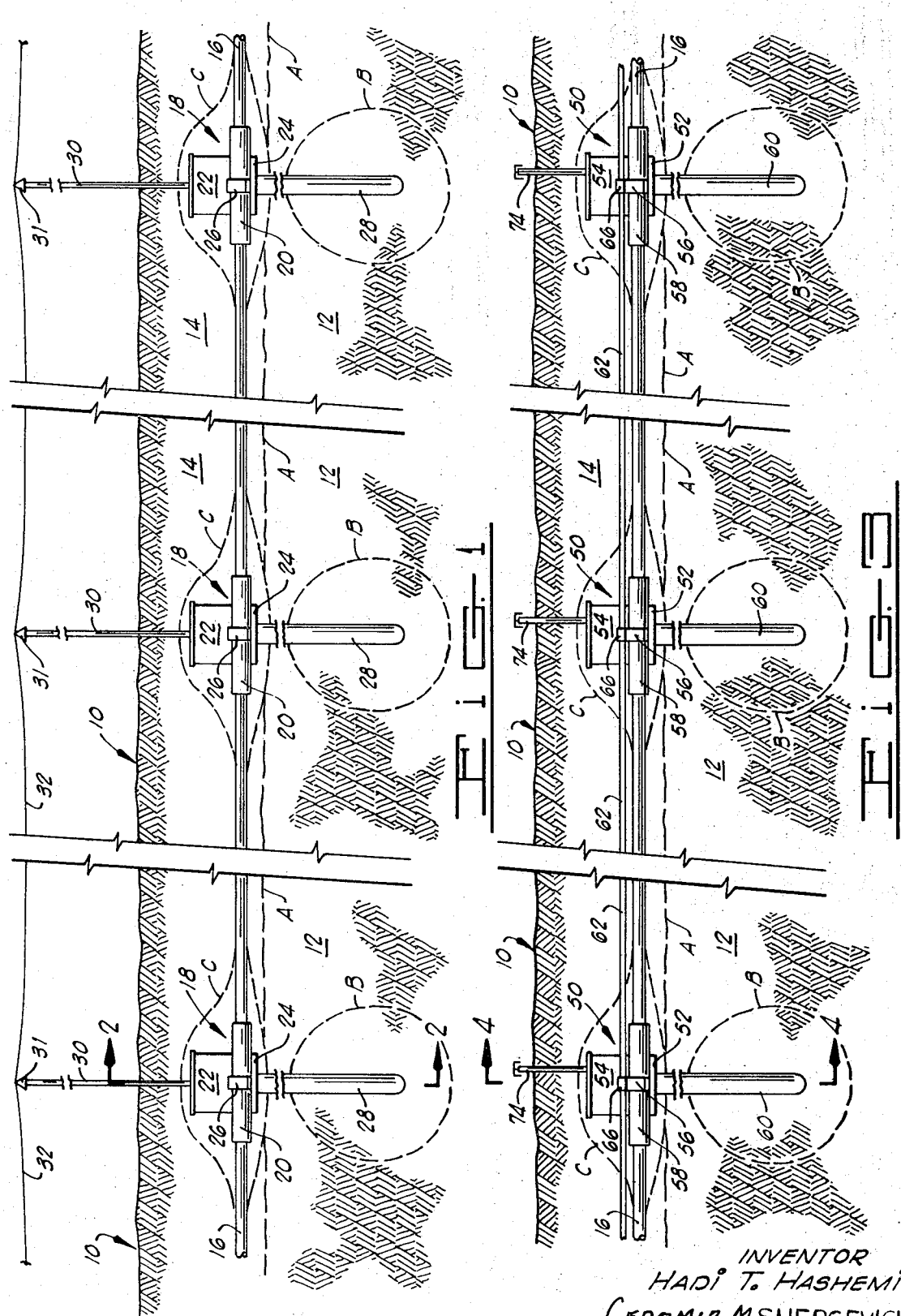

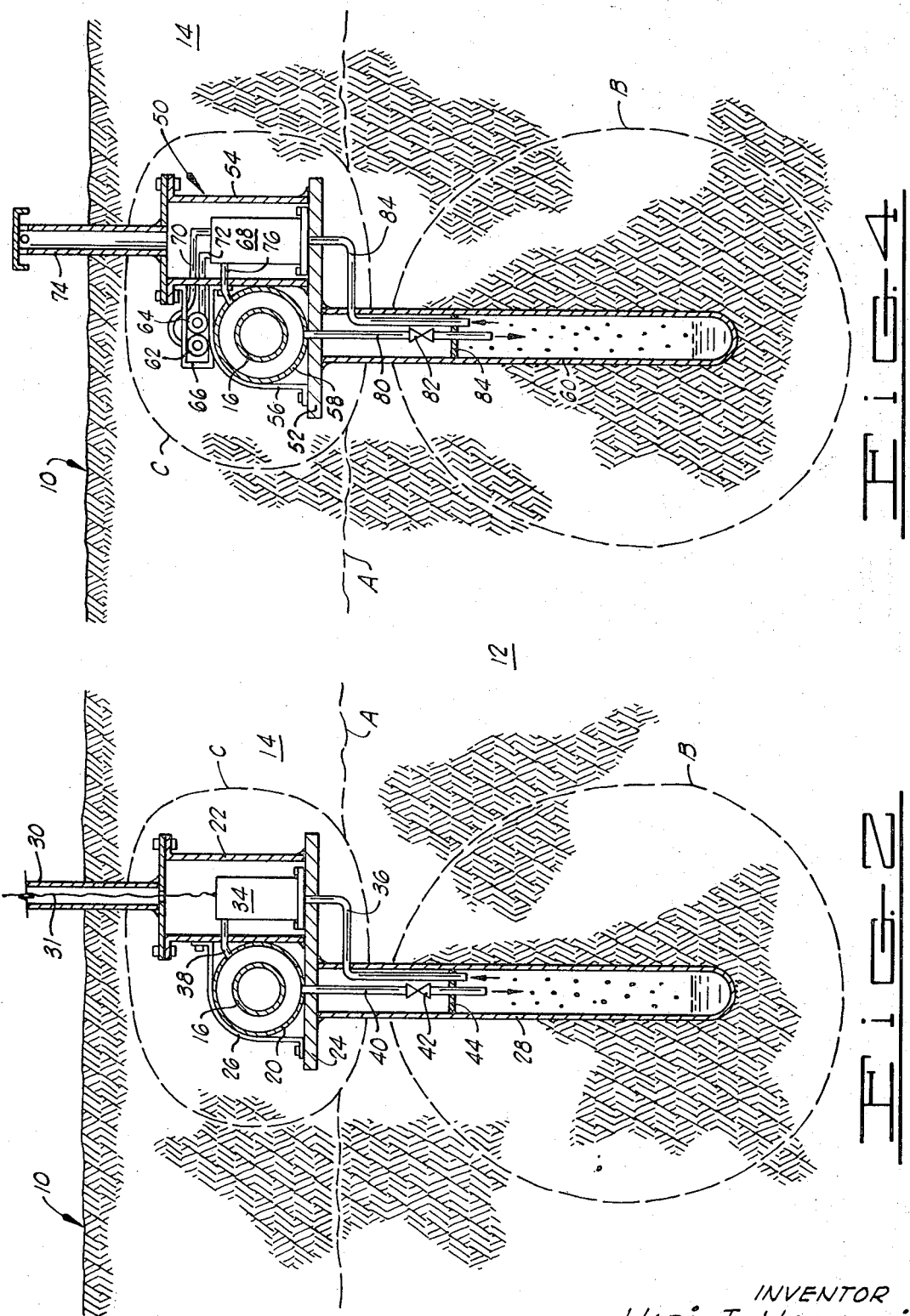

3,564,862
METHOD AND APPARATUS FOR SUPPORTING A PIPELINE IN PERMAFROST ENVIRONMENT
Hadi T. Hashemi, P.O. Box 2594, and Cedomir M. Sliepcevich, 2500 Butler Drive, both of Norman, Okla. 73069
Filed Sept. 12, 1969, Ser. No. 857,355
Int. Cl. F25d 23/12
U.S. Cl. 62—56
12 Claims

ABSTRACT OF THE DISCLOSURE

The method of installing a pipeline in a permafrost environment including the steps of laying the pipeline below the surface of the ground, continuously freezing the soil below the pipeline at locations spaced longitudinally therealong to form a series of frozen earth piles supporting the pipeline, and concurrently, heating the pipeline at longitudinally spaced intervals therealong to prevent congelation of liquids being moved in the pipeline.

The apparatus of the invention comprises a refrigeration unit having an evaporative chamber positioned below the pipeline and a condenser chamber surrounding the pipeline. The refrigeration unit is constructed so that expansion in the evaporation chamber freezes the earth beneath the pipeline to form a pier or vertically extending supporting structure of frozen earth, and so that the compression and condensation of the refrigerant fluid heats the pipeline.

BACKGROUND OF THE INVENTION

Field of the invention

This invention relates to methods and apparatus for constructing pipelines, and more specifically, but not by way of limitation, to a method and apparatus for laying petroleum and natural gas pipelines in a permafrost environment.

Brief description of the prior art

Various proposals have been heretofore advanced for constructing buildings and other structures in northern latitudes to assure adequate foundation support for such structures when they are built upon ground underlain by permafrost. The problems encountered in any type of construction on ground which is underlain by the frozen soil referred to as permafrost are manifold, and techniques for overcoming these problems are still far from being perfected and offering complete solutions.

With the recent exploration for, and discovery of, significant deposits of hydrocarbons in the northern portions of Alaska, it has become apparent that for effective production of these minerals, solutions must be found for a variety of problems, including the building of roads for the accommodation of trucks carrying drilling equipment and the like to the situs of the deposits, and the construction of large diameter pipelines to convey the production from the so-called Northern Slope where they are located to more southerly ice free ocean terminals for trans-shipment, or to refineries located at a more southern latitude. These pipelines must necessarily traverse permafrost regions, these regions being defined as regions in which a thickness of frozen soil extends at a variable depth beneath the surface of the earth, and in which a temperature below freezing has existed continually for an extensive period of time. In permafrost areas, the ground near the surface which thaws each summer when the temperature of the surrounding air rises above freezing and which refreezes each winter is called the active zone or layer. The water in the thawed soil of the active zone has difficulty escaping, and the ground becomes almost saturated, with the uppermost layer forming a thick liquid. This ground actually tends to flow in ripples and is very unstable.

Permafrost varies in thickness from a few feet in central and southern Alaska to over 900 feet in northern Alaska. The permanently frozen soils constituting the permafrost mantle often contain great quantities of ice, either as wedges, massive layers, thin ice cells or minute ice crystals. Any disturbance of the surface that results in thawing of this interstitial ice makes the area unsuited for most structures, particularly if the soils are fine grained. Another problem which is encountered in connection with the placement of any permanent structures in the active zone adjacent the surface overlying a permafrost region is the phenomena of "bulging" which is characteristic of the active layer. As the active layer thaws seasonally and freeze again, it tends to expel any foreign substance upwardly. This process is aided by the water sinking downward during the warm season and freezing at the permafrost level.

It may thus be seen that the problems of constructing pipelines across permafrost-type terrain are particularly acute. If it is undertaken to bury the pipeline, and the line is placed in the active zone of the soil, the bulging forces will tend to expel the pipeline to the surface as the active layer seasonally thaws and freezes with the result that the pipeline will be damaged and maintenance will be very difficult and expensive. Moreover, due to the temperature at which it is necessary to maintain the oil in the pipeline in order to obtain the flow characteristics required, even where the active layer is quite thin, and the pipeline is laid below this layer in the permafrost, the temperature of the pipeline carrying the relatively warm oil will cause it to melt the ice laden permafrost, and to gradually sink downwardly therein over a period of time. As a result, unsupportable catenaries are developed in the pipeline, or bending stresses are imposed therein which damage or break the pipeline and make maintenance difficult, particularly at the depths which are involved in assuring that the pipeline is placed below the active layer at all points along its length.

BRIEF DESCRIPTION OF THE PRESENT INVENTION

The present invention provides a method and apparatus for laying or constructing a pipeline in a permafrost environment. Broadly described, such method comprises initially laying the pipeline below the surface of the ground, then continuously freezing the soil below the pipeline at locations spaced longitudinally therealong to form a series of frozen earth piles or piers supporting the pipeline. It should be pointed out that this "freezing" of the soil may constitute simply maintaining the already frozen permafrost in its frozen condition. The pipeline is supported on the frozen soil at the described locations. Concurrently with the supporting of the pipeline on the frozen soil piles at longitudinally spaced locations therealong, the pipeline is retained against any upward movement or tendency toward expulsion of the pipeline from the soil as a result of bulging forces acting thereon. Finally, concurrently with the continuous freezing of the soil below the pipeline at longitudinally spaced intervals therealong, the pipeline is continuously heated at the same longitudinally spaced intervals to prevent congelation of the liquids being moved through the pipeline.

The apparatus used in the practice of the method of the invention as thus described comprises a refrigeration unit having an evaporative chamber positioned below the pipeline and a condenser chamber surrounding the pipeline. The refrigeration unit is constructed so that expansion in the evaporation chamber freezes the earth beneath the pipeline to form a pier or vertically extending supporting structure of frozen earth, and so that compression and condensation of the refrigerant in the condenser chamber surrounding the pipeline acts to continuously heat the pipeline.

From the foregoing brief description of the invention, it will become apparent that a major and important object of the invention is to provide a system by which a pipeline may be effectively extended across terrain which is underlain by permafrost.

Another object of the invention is to provide a method and apparatus by which a pipeline can be placed below the surface of the earth and over, or in, permafrost in such a way that the pipeline will not shift appreciably upwardly or downwardly, either as a result of the heat of liquids carried by the pipeline, or as a result of bulging forces acting on the pipeline.

A further object of the present invention is to provide apparatus which provides for a stable support for a pipeline located either in permafrost or in the active layer above the permafrost, and which concurrently provides heat for maintaining a sufficiently high temperature in the liquid moving in the pipeline that the liquid can flow easily through the pipeline.

Another object of the present invention is to provide a method for building a pipeline through permafrost in such a way that the pipeline can be supported by the permafrost despite the conveyance therethrough of liquids at a temperature above the melting point of water.

Another object of the invention is to provide a method for laying a pipeline in the active layer of soil above permanently frozen permafrost so that such pipeline will not be expelled or moved toward the surface as a result of bulging forces acting on the pipeline over seasonal cycles.

Another object of the invention is to provide apparatus for supporting a pipeline stably beneath the soil in a permafrost environment, which apparatus can be relatively easily and inexpensively maintained as compared to a pipeline placed in the same location without benefit of such equipment.

Additional objects and advantages of the invention will become apparent as the following detailed description of the invention is read in conjunction with the accompanying drawings which illustrate the invention.

BRIEF DESCRIPTION OF THE DRAWINGS

FIG. 1 is a side elevation view of a pipeline which has been placed in a permafrost environment by the method of the invention and using one embodiment of the apparatus of the invention.

FIG. 2 is a sectional view taken along line 2—2 of FIG. 1.

FIG. 3 is a side elevational view similar to FIG. 1, but illustrating a modified embodiment of the apparatus of the invention in use for supporting the pipeline in the permafrost environment.

FIG. 4 is a sectional view taken along line 4—4 of FIG. 3.

DETAILED DESCRIPTION OF A PREFERRED EMBODIMENT OF THE INVENTION

Referring initially to FIG. 1 of the drawings, shown therein is a section of terrain designated generally by reference numeral 10. The ground below the surface is permanently frozen below a certain depth A, this earth constituting permafrost and being designated by reference numeral 12. Above the layer of permafrost 12, is a layer of earth which thaws during the warm summer months when the temperature of the air above the earth is highest and which is referred to as the active layer 14. The active layer 14 will periodically freeze and then thaw as seasonal changes occur.

A pipeline 16 for carrying crude oil or the like is buried in the earth at a depth which may locate the pipeline either above the boundary A of the active layer 14 or below this boundary in the permanently frozen permafrost 12. As illustrated in FIG. 1, the pipeline 16 has here been located in the active layer. At longitudinally spaced intervals along the pipeline 16, apparatus is provided which assures that the pipeline will remain in a fixed location, and that the liquid flowing therethrough will be maintained sufficiently warm to assure no difficulty in achieving the desired flow rate. This apparatus is a refrigeration unit designated generally by reference numeral 18 and includes a cylindrical sleeve 20 which concentrically surrounds the pipeline 16 and defines therewith an annulus. The opposite ends of the annulus between the pipeline 16 and the sleeve 20 are closed. The sleeve is retained in the angle between one vertical wall of a compressor housing 22 and a horizontally extending support plate 24 which is secured to the lower side of the compressor housing. A strap 26 is used to hold this sleeve 20 and the pipeline 16 which it surrounds in this position. Extending vertically downwardly from the support plate 24 is a hollow support pile 28 which functions in a manner hereinafter described as an evaporator chamber for the refrigeration unit 18. Extending upwardly from the upper side of the compressor housing 22 is an externally electrically insulated tube 30 which contains a conductor 31 which is connected to a power line 32 at its upper end.

The details of construction of the refrigeration unit 18 are best illustrated in FIG. 2. As here shown, the compressor housing 22 contains a hermetically sealed compressor unit 34 which receives refrigerant gas from a conduit 36, and discharges refrigerant gas under pressure through a conduit 38 into the annulus between the sleeve 20 and the pipeline 16. This annulus constitutes a condenser chamber, and under the pressure developed by the compressor 34, gases are condensed in the condenser chamber and in undergoing condensation, yield or give up heat. Thus, the pipeline 16 is warmed by the process of condensing the refrigerant vapors. The liquid refrigerant resulting from the condensation is discharged through a conduit 40 which extends downwardly into the hollow support pile 28. The conduit 40 passes through a throttling valve 42 and has its lower end extended through a partition 44 extending transversely across the support pile 28. It will be perceived that the liquid refrigerant discharged from the lower end of the conduit 40 can undergo expansion in the lower end of the support pile 28 and thus be converted to a gas. The resultant cooling or refrigerating effect is well known. The vapors developed by expansion of the liquid refrigerant in the lower end of the hollow support pile 28 are returned to the compressor 34 through the conduit 36 which extends into the upper end of the support pile 28 and through the partition 44. Power for the operation of the compressor is brought to the compressor through the electrical conductor 31 which is protectively enclosed in the tube 30.

OPERATION

In the operation of the apparatus depicted in FIGS. 1 and 2 for the purpose of performing the method of the invention, the pipeline is first emplaced in the soil or earth at a desired depth. It is preferable, where the depth of the active layer 14 permits, to place the pipeline 16 below the active layer so as to avoid the problems engendered by buckling forces to force the pipeline upwardly to the surface. However, where the active layer 14 extends to a relatively great depth, it may be necessary to place the pipeline 16 in the active layer, and this situation is illustrated in the drawing.

As the pipeline 16 is constructed, at longitudinally spaced intervals therealong, the refrigeration units 18 are placed in position with a sufficient excavation being made in the permafrost to accommodate the support piles 28 and a sufficient cavity being made in the active layer to accommodate the compressor housing 22, and to pass the tubing 30 through the soil to the surface. With the pipeline constructed in the manner described, operation of the compressors 34 are commenced so that the refrigeration units 18 function in a generally well understood manner. The arrangement of the components of the refrigeration units 18 is such that temperature reduction occurs in the lower end portions of the support piles 28 due to the evaporation of the liquid refrigerant within the support piles. There therefore results a sub-cooling of the earth around the support piles 28 and the consequent formation of relatively large zones of permanently frozen earth which will constitute support piers for the pipeline. This region of permanently frozen earth is demarcated in FIG. 1 by the dashed lines lettered B. A distinction must be made as to this area, which remains under the constant influence of the temperature reduction effected by evaporation within the support pile 28 because, except for the existence of such permanently frozen zone, the pipeline 16 as it is warmed by the liquid passing therethrough will, in effect, burn through or melt through the permafrost and gradually sink downwardly in the earth. However, the presence of the large zone of permanently frozen earth within the boundary B constituting a solid support pier, in conjunction with the rigid support afforded by the upper end of the support pile 28, effectively maintains the pipeline 16 at the illustrated location.

Since the pipeline 16 in the illustrated location is located in the active layer 14, it is subject to the bulging forces which have been hereinbefore described. Therefore with seasonal thawing and refreezing, there is a tendency for the pipeline 16 to be excluded from the soil by forcing it to the surface. Upward movement of the pipeline is counteracted by its rigid connection to the upper end of the support pile 28 by means of the support plate 24 and the securing strap 26.

A second major function of the refrigeration units 18 is to warm the pipeline 16 sufficiently to prevent the environmental temperature from affecting the flow of liquids therethrough. Thus, in the frozen soil environment in which the pipeline 16 is located, if the pipeline were not warmed, the viscosity of crude oil flowing therethrough would be lowered to such an extent that pumping and flow maintenance would be extremely difficult. With the apparatus depicted, however, the compressor unit 34 discharges vapors under compression into the condenser chamber formed between the pipeline 16 and the sleeve 20. Here, in undergoing condensation, the refrigerant vapors give off the latent heat of vaporization of the refrigerant material, and this is in turn heat exchanged with the liquid flowing through the pipeline 16. There is thus a warming of this liquid which prevents it from becoming thick or congealing.

It may be pointed out that, due to the warming of the pipeline 16 as a result of condensation of the refrigerant vapors therearound, the soil surrounding the pipeline is also warmed to some extent with the result that a permanently thawed area will exist around the pipeline at the location of the refrigeration unit 18. A dashed line designated by numeral C identifies the boundary of this permanently thawed zone. An ancillary advantage accruing from the presence of the permanently thawed zone around the refrigeration unit 18 is that in the event that maintenance or repair of the unit is required, accessibility of the unit through the thawed soil which surrounds it is considerably easier than would be the case if the soil were permitted to become frozen. This would occur, of course, during the colder months of the winter even where the pipeline is laid in an active layer. The presence of the permanently thawed zone around the compressor housing 22 and the pipeline adjacent the compressor housing also affords an effective counteraction to the bulging forces which normally act on a pipeline laid in the active layer of the soil. Thus, the zone of moist, thawed earth surrounding the refrigeration units 18, and to a lesser extent, extending outwardly along the pipeline from these units as a result of the movement of the heated oil therethrough, act as force absorption zones tending to absorb the bulging forces resulting from cyclical thawing and freezing of the active zone. Thus, as the soil in the active zone 14 undergoes alternate freezing and thawing with seasonal changes, the soil surrounding the refrigeration units 18 nevertheless remains in a thawed condition, is therefore relatively soft, and thus can undergo some expansion and contraction in response to compressional forces being applied and relaxed in the course of the changes of state of the active layer.

A modified embodiment of the invention is illustrated in FIGS. 3 and 4 of the drawings. Here the pipeline 16 has again been placed in the active layer 14 above the boundary A which separates this layer from the permafrost 12 therebelow. As in the case of the embodiment of the apparatus depicted in FIGS. 1 and 2, the pipeline 16 is again supported on longitudinally spaced refrigeration units disposed along the length thereof, these units being designated generally by reference numeral 50 in FIG. 3. In the FIG. 3 embodiment, however, the refrigeration units are gas refrigeration units containing no moving parts. This type of refrigeration apparatus is well known in the art.

For the purpose of connecting the gas refrigeration units 50 to the pipeline 16, a horizontally extending support plate 52 is provided and is connected to the lower side of a refrigeration unit housing 54. A strap 56 is used to retain the pipeline 16 and a sleeve 58 which surrounds it in the angle between the refrigeration unit housing 54 and the supporting plate 52. A hollow tubular support pile 60 is secured to, and extends downwardly from, the supporting plate 52. Extending along and above the pipeline 16 are a pair of conduits 62 and 64 (see FIG. 4), which conduits are retained in position by any suitable means, such as the bracket 66 shown in FIG. 4. The conduits 62 and 64 carry compressed air and natural gas, respectively, for the purpose of supplying the fuel utilized in the burner unit 68 contained within the refrigeration unit housing 54. A pair of conduits 70 and 72 convey the natural gas and compressed air from the conduits 62 and 64 to the burner unit 68. A hollow stack 74 extends from the unit housing 54 to the surface of the ground for venting combustion products from the housing 54.

In other respects, the gas refrigeration units 50 are similar in construction to the electrically operated units illustrated in FIGS. 1 and 2. Thus, the sleeve 58 forms an annulus with the pipeline 16, which annulus acts as a condensation chamber for the condensation of refrigerant vapors delivered to the chamber through a conduit 76 from the gas refrigeration unit. A conduit 80 extends downwardly from the lower side of the annulus through the supporting plate 52 and into the hollow support pile 60. The conduit 80 passes through an expansion valve 82 and a transverse partition 84 so that its lower end is disposed in the lower end portion of the hollow support pile 60. Here the refrigerant liquid undergoes expansion to the gaseous state and effects the necessary cooling hereinbefore described. The gaseous vapors are returned to the burner unit 68 through a return conduit 84.

The refrigeration units 50 used in the embodiment depicted in FIGS. 3 and 4 provide some advantage over the electrically operated compressor type units depicted in FIGS. 1 and 2 in that the small gas refrigeration units have a high degree of reliability, and maintenance is reduced due to the non-existence of any moving parts in the units. On the other hand, there is required, of course, for the operation of the gas refrigeration units 50, a supply of compressed air and a fuel gas of some type extending along the length of the pipeline 16.

From the foregoing description of the invention, it will be perceived that a method and apparatus for supporting a pipeline in a permafrost environment has been provided, and that this system permits a pipeline to be retained in substantially the same location without sinking into the permafrost as a result of the heat of the liquid passed through the pipeline, and without being expelled from the active layer as a result of the bulging phenomena. Moreover, the units effectively deliver heat to the pipeline so that the oil therein is maintained in a fluid condition facilitating high flow rates and low pumping requirements.

Although certain preferred embodiments of the invention have been herein disclosed in order to illustrate its operation in a manner sufficient for those skilled in the art to practice the invention, it is to be understood that various changes and modifications in the described structure and steps of the method can be effected without departure from the basic principles of the invention. All such changes and innovations are therefore deemed to be circumscribed by the spirit and scope of the invention.

What is claimed is:

1. A method for supporting a pipeline in a permafrost environment comprising:
    laying the pipeline below the surface of the ground;
    cooling the ground below the pipeline to continuously maintain the ground below the pipeline in a frozen condition;
    supporting the pipeline on the frozen ground therebelow; and
    continuously warming portions of the pipeline to facilitate oil flow therethrough.

2. The method defined in claim 1 and further characterized to include the step of connecting the pipeline to the ground frozen by cooling on which the pipeline is supported to prevent upward movement of the pipeline in the ground as a result of bulging phenomena.

3. The method defined in claim 2 wherein the pipeline is laid in an active layer of soil overlying permafrost, which active layer seasonably thaws and refreezes.

4. The method defined in claim 1 wherein the steps of cooling the ground and continuously warming portions of the pipeline are concurrently carried out by condensing a refrigerant around the pipeline by pressurization, and expanding the condensed refrigerant to a gaseous state in a closed hollow pile below the pipeline.

5. A pipeline system for transporting a fluid across terrain underlain by permafrost comprising:
    a pipeline;
    means adjacent said pipeline for condensing a refrigerant material and concurrently warming said pipeline;
    a hollow pile extending downwardly from said pipeline and forming an evaporation chamber for expanding said refrigerant material to a vapor state and concurrently freezing the earth surrounding said hollow pile;
    means for circulating liquid from said condensing means to said hollow pile; and
    means for circulating vapor from said hollow pile to said condensing means.

6. A pipeline system as defined in claim 5 wherein said condensing means comprises:
    a sleeve around a portion of said pipeline and defining a chamber therewith;
    a compressor supported adjacent said sleeve; and
    means connecting said compressor with said chamber for facilitating the pressurization of refrigerant in said chamber.

7. A pipeline system as defined in claim 6 and further characterized as including a power line extending substantially parallel to said pipeline for conveying electrical power to said compressor.

8. A pipeline system as defined in claim 5 wherein said condensing means is a portion of a gas refrigeration unit.

9. A pipeline system as defined in claim 8 and further characterized to include conduit means extending substantially parallel to said pipeline for conveying fuel to said gas refrigeration unit.

10. A pipeline system as defined in claim 5 and further characterized to include means connecting said pile to said pipeline to prevent relative movement therebetween.

11. A pipeline system for conveying oil in cold environments comprising:
    a pipeline;
    first means spaced longitudinally along the pipeline for externally heating the pipeline to prevent congelation of the oil flowing therethrough; and
    second means spaced longitudinally along the pipeline and located below the pipeline for freezing a volume of earth; and
    means supporting the pipeline on the frozen earth volumes.

12. A pipeline system as defined in claim 11 wherein said first and second means constitute refrigeration units spaced longitudinally along said pipeline.

References Cited

UNITED STATES PATENTS

| 2,554,661 | 5/1951 | Clancy | 62—260 |
| 3,217,791 | 11/1965 | Long | 62—260 |
| 3,220,470 | 11/1965 | Balch | 165—45 |
| 3,472,314 | 10/1969 | Balch | 165—106 |

WILLIAM J. WYE, Primary Examiner

U.S. Cl. X.R.

62—260; 165—45; 61—36